US012233929B1

(12) United States Patent
Ondrasik, Jr. et al.

(10) Patent No.: US 12,233,929 B1
(45) Date of Patent: Feb. 25, 2025

(54) SHOPPING CART DOUBLE HANDLE SYSTEM

(71) Applicant: THE ONDRASIK FAMILY TRUST DATED 11/3/1999, Commerce, CA (US)

(72) Inventors: V. John Ondrasik, Jr., Granada Hills, CA (US); V. John Ondrasik, IV, Westlake Village, CA (US)

(73) Assignee: THE ONDRASIK FAMILY TRUST DATED 11/3/1999, Commerce, CA (US)

( * ) Notice: Subject to any disclaimer, the term of this patent is extended or adjusted under 35 U.S.C. 154(b) by 0 days.

(21) Appl. No.: 18/895,121

(22) Filed: Sep. 24, 2024

Related U.S. Application Data

(60) Provisional application No. 63/541,459, filed on Sep. 29, 2023.

(51) Int. Cl.
*B62B 5/06* (2006.01)
*B62B 3/14* (2006.01)

(52) U.S. Cl.
CPC ............ *B62B 5/064* (2013.01); *B62B 3/1444* (2013.01)

(58) Field of Classification Search
CPC .............................. B62B 5/064; B62B 3/1444
See application file for complete search history.

(56) References Cited

U.S. PATENT DOCUMENTS

| 5,579,556 | A | * | 12/1996 | Chung | B62B 9/20 16/110.1 |
| 10,829,138 | B2 | * | 11/2020 | Sherman | B62B 3/146 |
| 11,059,508 | B1 | * | 7/2021 | Byrd | B62B 5/065 |
| 2003/0229966 | A1 | * | 12/2003 | Boice | B62B 9/20 16/110.1 |
| 2022/0379944 | A1 | * | 12/2022 | Bernal | B62B 5/069 |
| 2024/0199105 | A1 | * | 6/2024 | McIntosh | B62B 3/1444 |

FOREIGN PATENT DOCUMENTS

| JP | 3246196 U | * | 3/2024 |
| KR | 20120008096 U | * | 11/2012 |
| WO | WO-2019198271 A1 | * | 10/2019 |

OTHER PUBLICATIONS

KR-20120008096-U English Translation (Year: 2012).*
WO-2019198271-A1 English Translation (Year: 2019).*
JP-3246196-U English Translation (Year: 2024).*

* cited by examiner

*Primary Examiner* — James A Shriver, II
*Assistant Examiner* — Michael T. Walsh
(74) *Attorney, Agent, or Firm* — David R. Heckadon; Gordon Rees Scully Mansukhani LLP

(57) ABSTRACT

A double handle shopping cart system including a shopping cart frame with a child's seat basket, with an upper rear handle for a taller shopper to hold onto and a pair of lower rear handles for a shorter shopper to hold onto.

14 Claims, 8 Drawing Sheets

SHOPPING CART DOUBLE HANDLE SYSTEM

RELATED APPLICATION

The present application claims priority to U.S. Provisional Patent Application Ser. No. 63/541,459, of same title, filed Sep. 29, 2023, the entire specification of which is incorporated herein by reference in its entirety for all purposes.

TECHNICAL FIELD

The present invention relates to shopping carts.

BACKGROUND OF THE INVENTION

Standard shopping carts all have an upper back handle that spans across the back of the shopping cart. The shopper holds onto this handle as (s)he moves the cart through a store. Typically, this upper back handle forms one side of the child seat found in many shopping carts. Unfortunately, the height of this upper back handle is not adjustable. This is not ideal for shorter users during their shopping experience.

It would instead be desirable to provide a shopping cart with an additional lower handle to serve as another option for shoppers of shorter stature. Specifically, it would be desirable to provide a system where shoppers could grasp onto the shopping cart at whichever of the two locations they prefer. As will be shown, the present system provides such a solution.

SUMMARY OF THE INVENTION

In preferred aspects, the present system provides a double handle shopping cart system, comprising: a shopping cart frame; a child's seat basket at a top rear end of the shopping cart frame; an upper rear handle positioned above the child's seat basket at a top rear of the shopping cart frame; and at least one lower rear handle attached to the shopping cart frame, wherein the at least one lower rear handle is positioned below the upper rear handle.

Preferably, at least one lower rear handle is a pair of lower rear handles. In preferred aspects, the pair of lower rear handles are positioned at opposite sides of the shopping cart, being on opposite sides of the child's seat basket.

As will be shown, the pair of lower rear handles are preferably connected to each of the upper rear handles above and the child's seat basket. In addition, the pair of lower rear handles may be connected to side supporting members of the shopping cart frame.

In various preferred aspects, the pair of lower rear gripping handles have openings above and below such that a user can wrap their fingers around the pair of lower gripping handles. In addition, each of the upper and lower rear gripping handles may further comprise plastic gripping surfaces, and the lower rear handles may preferably have plastic gripping surfaces with flattened top edges.

As such, the re-engineered back portion of a child's seat basket now accommodates two handles on the left and right side of the cart. This design will allow taller shoppers to use the regular single cart handle grips positioned above, and shorter shoppers to use the lower handle grips positioned below.

DETAILED DESCRIPTION OF THE DRAWINGS

Figure 1:
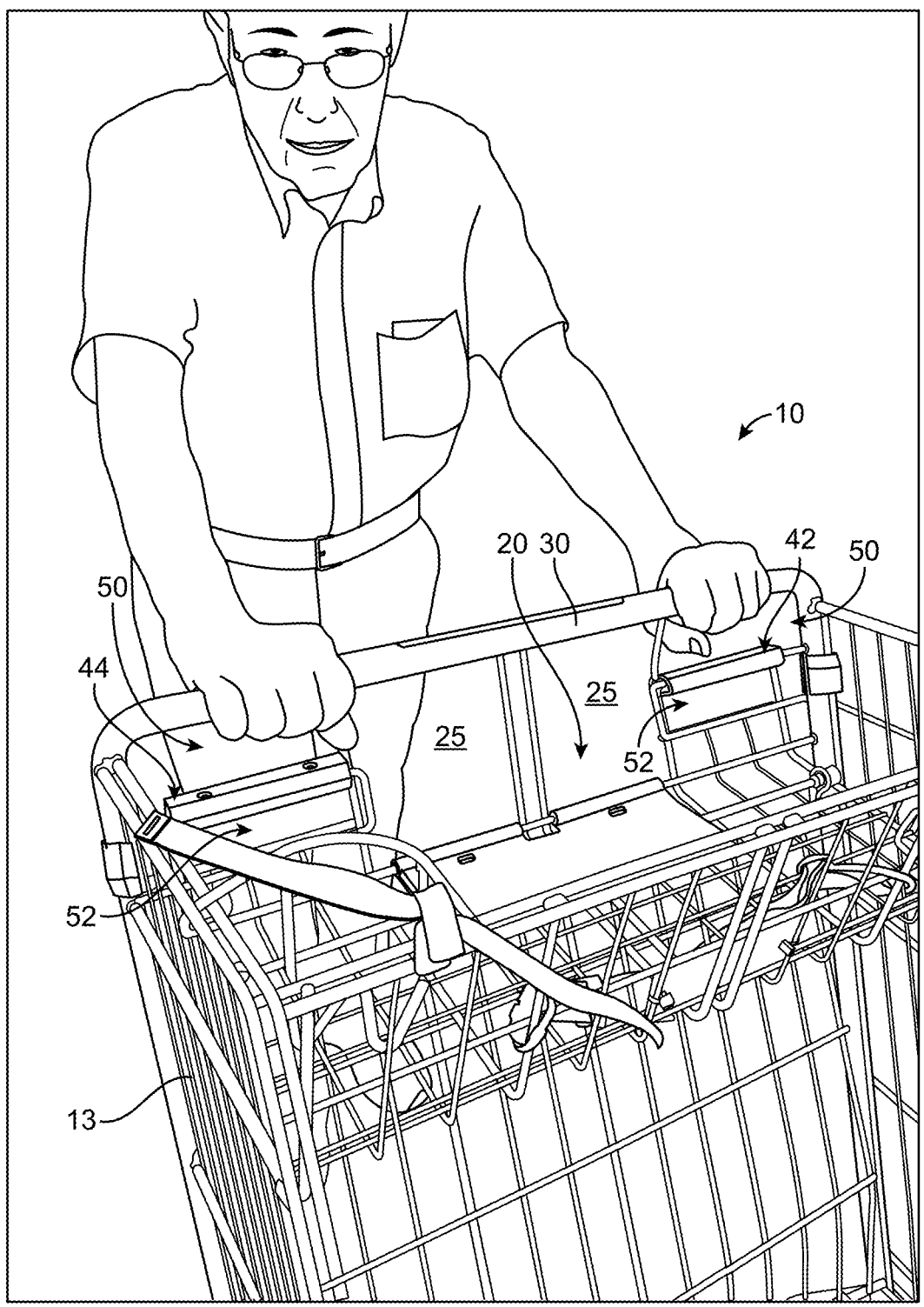
FIG. 1 is a front perspective view of the present double handle shopping cart showing a user grasping a single upper handle.

The attached Figures illustrate an exemplary shopping cart having a double handle system. Similar to many existing shopping carts, shopping cart 10 has a front wall 11; a left side wall 12; a right side wall 13; a rear wall 14; and a bottom or bottom wall 15. Also similar to existing shopping carts, shopping cart 10 has a child's seat basket 20. Child's seat basket 20 is formed between side walls 12 and 13, rear wall 14, a back wall 22, and a bottom or bottom wall 24. In addition, a pair of leg openings 25 are provided in rear wall 14 for the child to stick his/her legs through.

Figure 2:
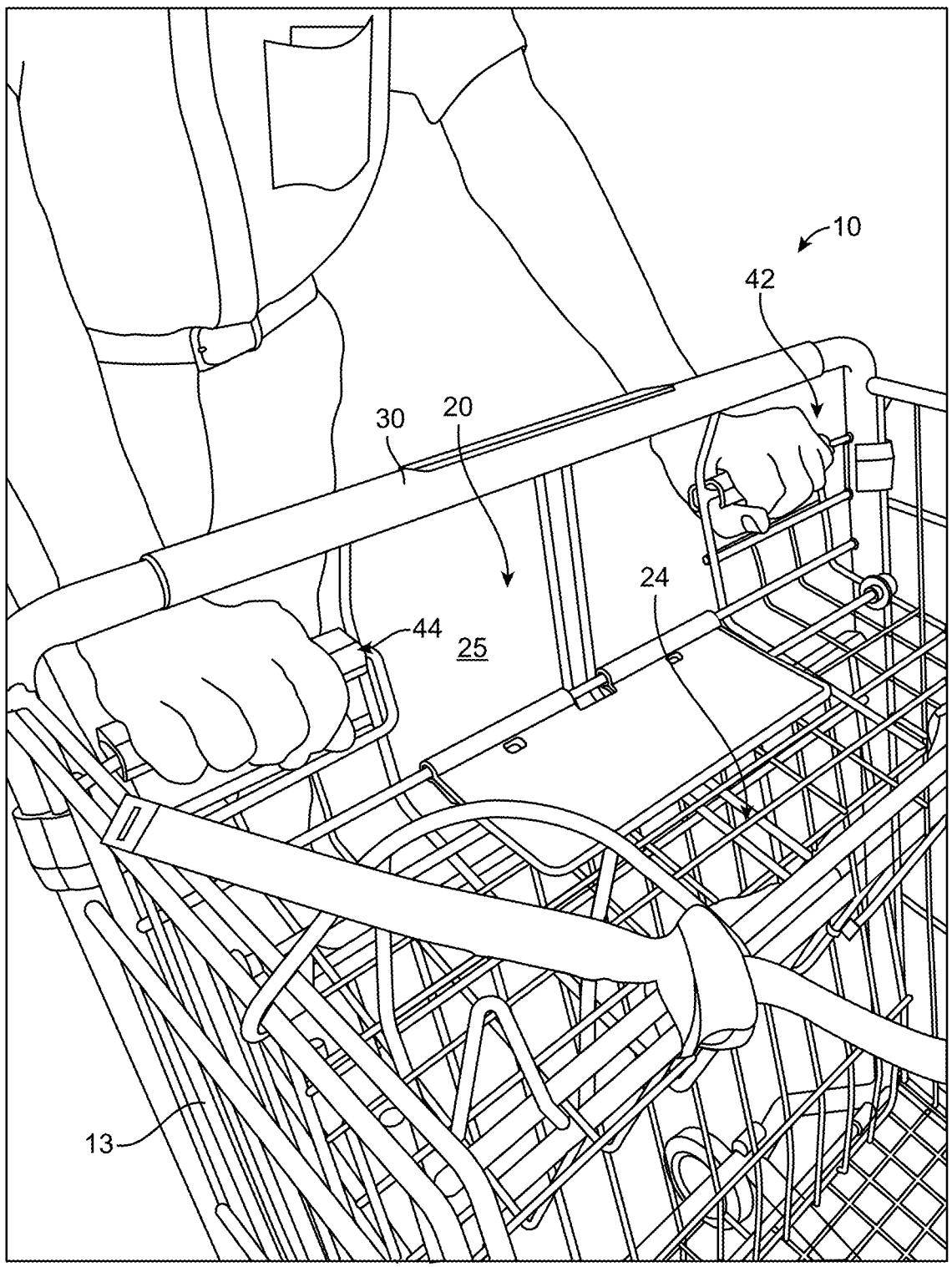
FIG. 2 is a front perspective view of the present double handle shopping cart showing a user grasping a pair of lower handles.

The present system includes a novel double handle system for comfort of users of different heights, as follows. As seen in FIGS. 1 and 2, the upper rear handle 30 of the present shopping cart is shown. Upper rear handle 30 is a standard feature on many existing shopping cart frames. Upper rear handle 30 also preferably forms part of the rear wall 14 of shopping cart 10. As illustrated above, the upper rear handle 30 can be positioned at the top of rear wall 14, and the pair of lower rear handles 42 and 44 can be positioned in the plane of rear wall 14. In addition, the pair of lower rear handles 42 and 44 can preferably be positioned above a bottom 24 of the child's seat basket 20.

Figure 3:
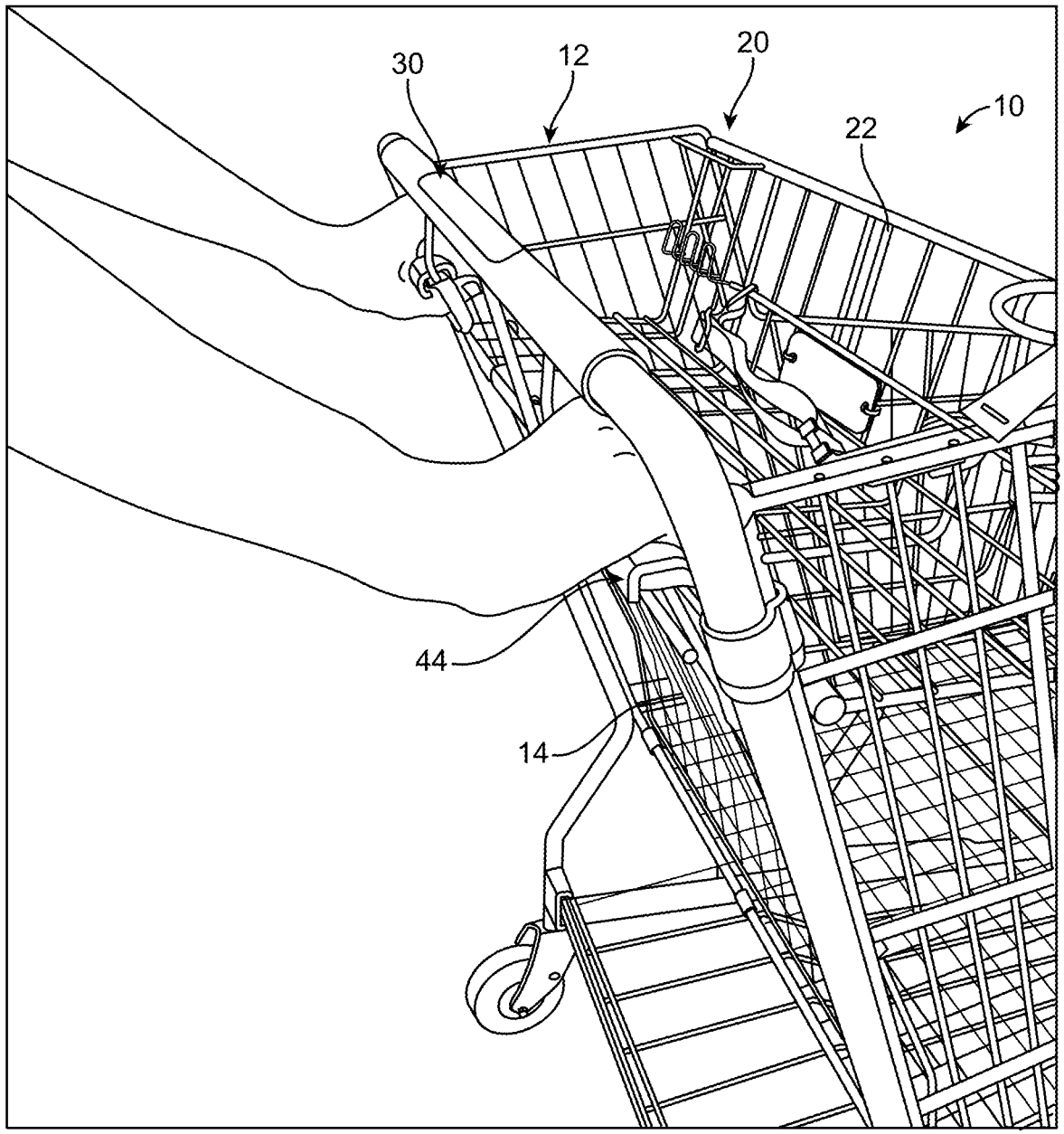
FIG. 3 is a rear side perspective view corresponding to FIG. 2.

In accordance with the present system, a pair of lower rear handles 42 and 44 are also shown. As seen in FIGS. 2 and 3, a shorter user may simply use lower handles 42 and 44 if this gripping height better suites them. As can be seen, the upper rear handle 30 is positioned above the child's seat basket 20 at a top rear of the shopping cart frame 10, and the pair of lower rear handles 42 and 44 are also attached to the shopping cart on either side of the child's leg openings 25.

Figure 4:
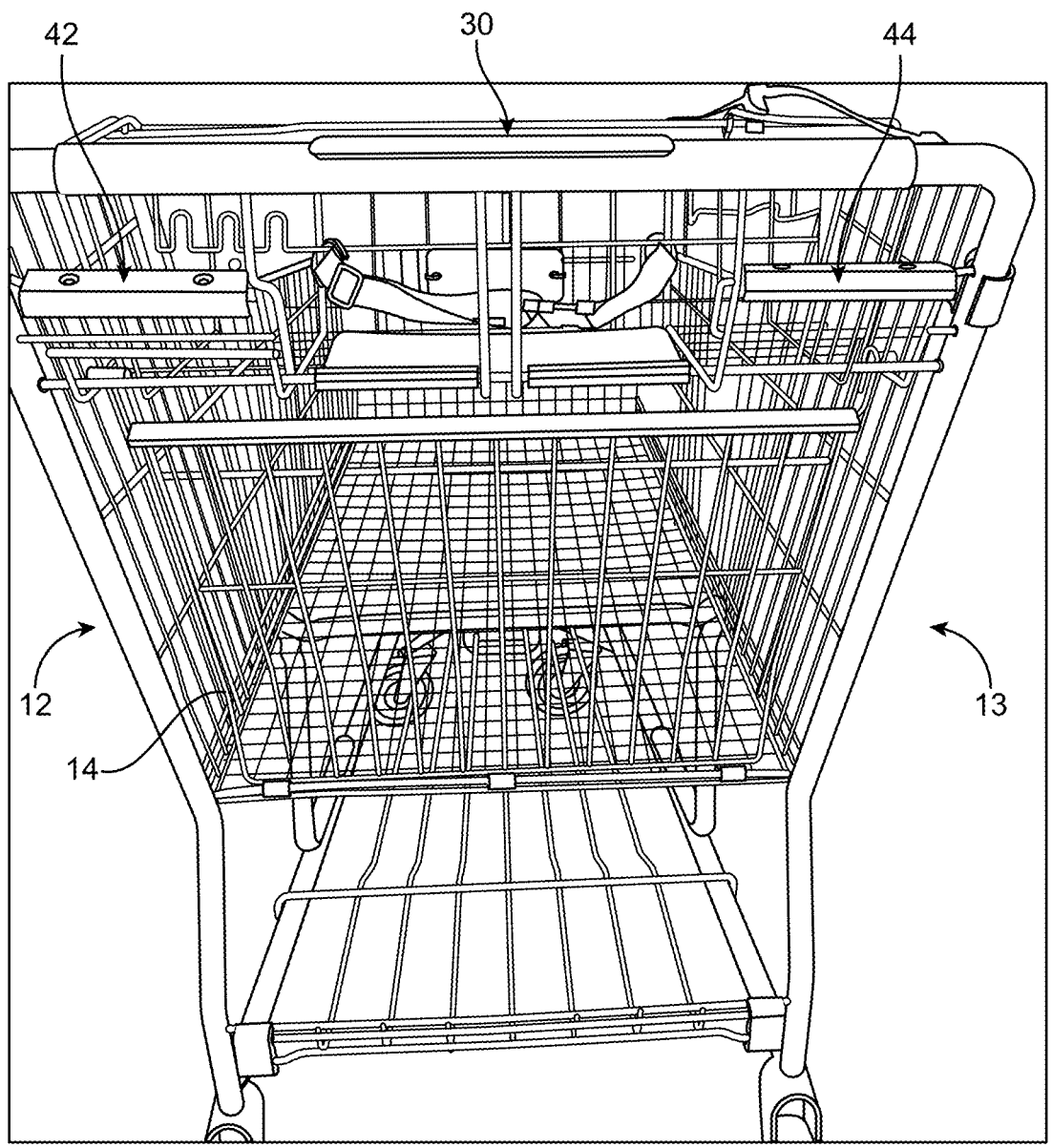
FIG. 4 is a rear elevation view showing the single upper rear gripping handle above and the pair of lower rear gripping handles below.
Figure 5:
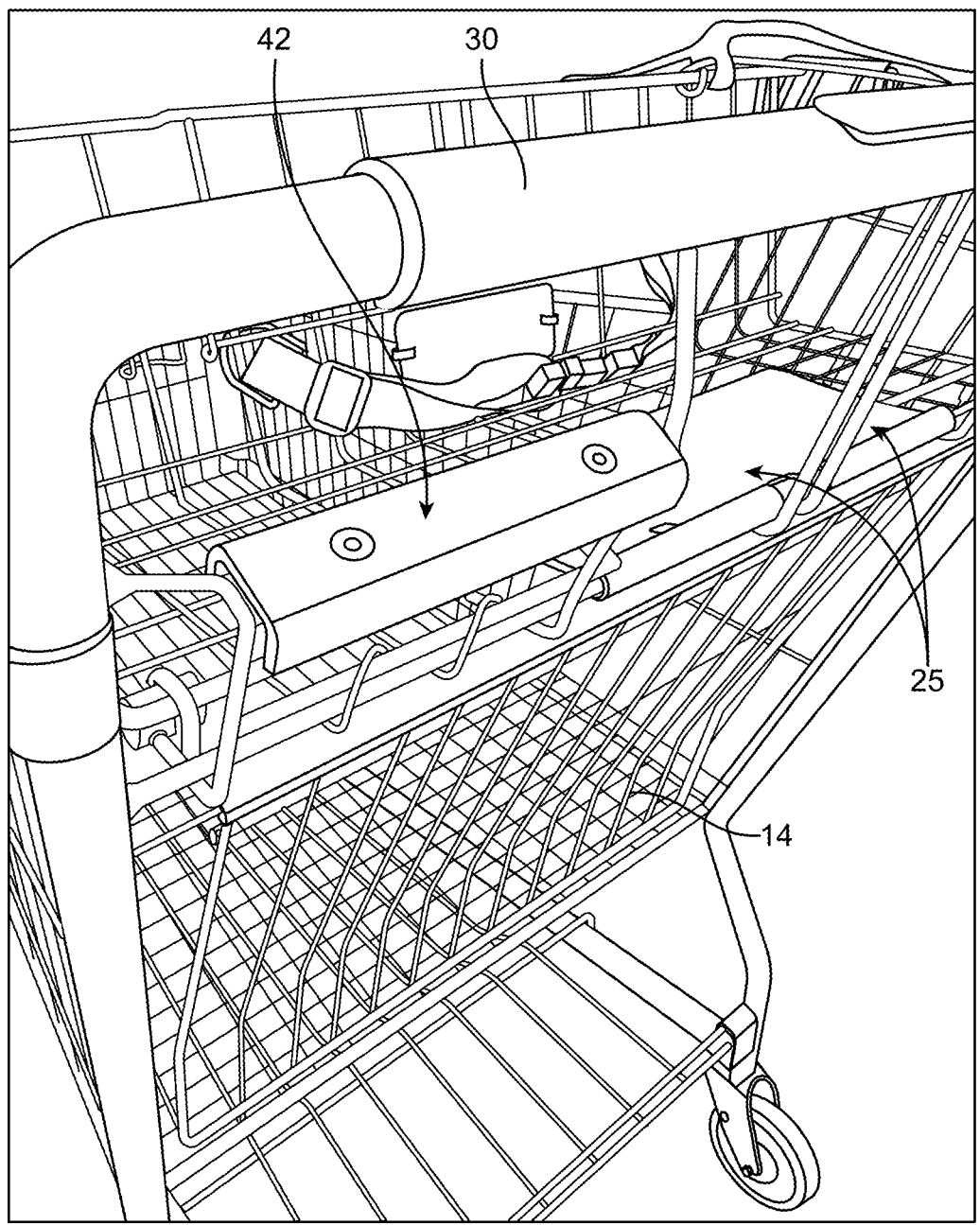
FIG. 5 is a rear perspective view of the left lower gripping handle.
Figure 6:
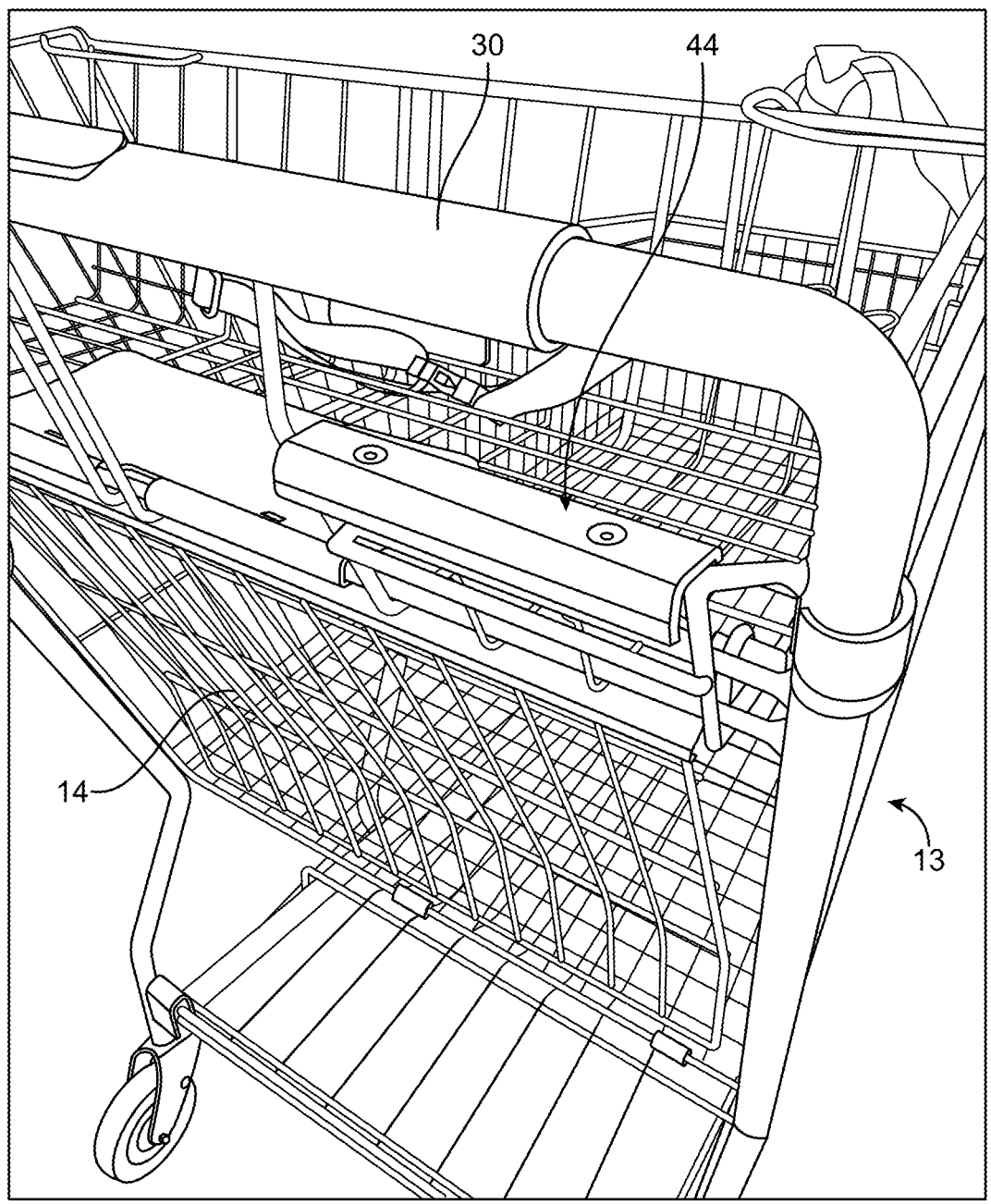
FIG. 6 is a rear perspective view of the lower right gripping handle.
Figure 7:
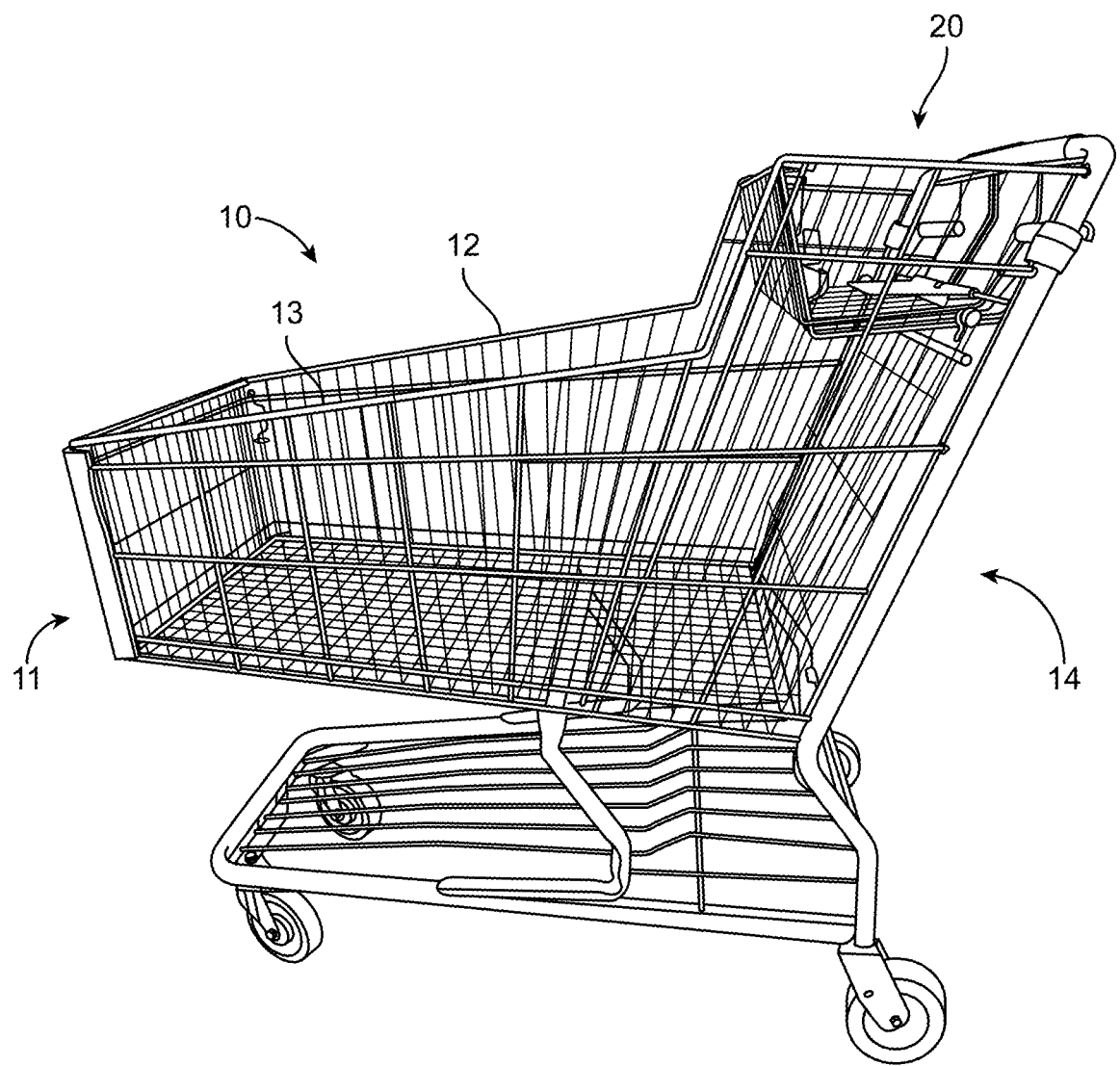
FIG. 7 is a side perspective view of a shopping cart with the present double handle system.
Figure 8:
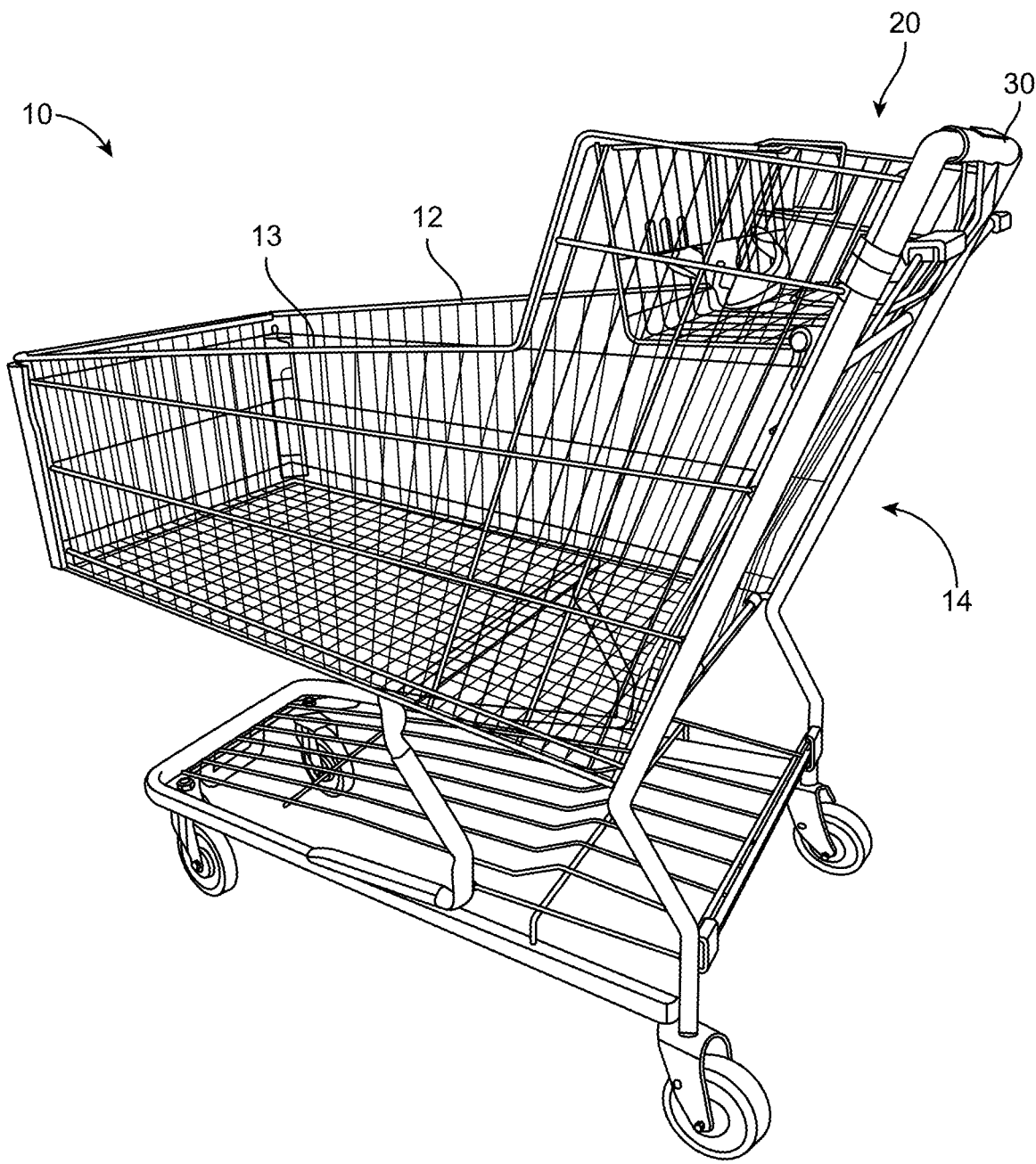
FIG. 8 is a side rear perspective view of the present double handle shopping cart.

As seen in FIGS. 4 through 6, the pair of lower rear handles 42 and 44 are positioned at opposite sides of the shopping cart 10, and on opposite sides of the child's seat basket 20 next to leg openings 25. Lower rear handles 42 and 44 are preferably connected to side supporting members in side walls 12 and 13 of the shopping cart 10.

As best seen in FIGS. 1 and 2, the pair of lower gripping handles 42 and 44 have openings 50 above and openings 52 below. As such, a user can wrap their fingers around the pair of lower rear handles 42 and 44 (as seen in FIG. 2), or openings 50 can receive a user's fingers therein when the user holds onto the upper gripping handle 30. As such, openings 50 can advantageously be used in either the upper or lower handle gripping positions. Openings 50 and 52 may simply be formed as openings in rear wall 14.

In preferred embodiments, each of the upper and lower rear handles 30 and 42/44 further comprise plastic gripping surfaces with flattened top edges for user comfort. The gripping surfaces can be made of other suitable materials, and into any shape as desired. In optional embodiments, lower handles 42 and 44 may instead extend rearwardly from the rear wall 14 of the shopping cart 10, and thus not be in the plane of rear wall 14. It is to be understood that the present invention is not limited to either of these alternate embodiments.

What is claimed is:

1. A double handle shopping cart system, comprising:
   a shopping cart frame;
   a child's seat basket at a top rear end of the shopping cart frame;
   an upper rear handle positioned above the child's seat basket at a top rear of the shopping cart frame; and
   at least one lower rear handle attached to the shopping cart frame, wherein the at least one lower rear handle is positioned directly below the upper rear handle in a plane of a rear wall of the shopping cart frame.

2. The system of claim 1, wherein the at least one lower rear handle comprises:
   a pair of lower rear handles.

3. The system of claim 2, wherein the pair of lower rear handles are positioned at opposite sides of the shopping cart.

4. The system of claim 2, wherein the pair of lower rear handles have openings above and openings below such that a user can wrap his/her fingers around the pair of lower rear handles.

5. The system of claim 2, wherein the shopping cart frame comprises:
   a front wall;
   a left side wall;
   a right side wall;
   a rear wall; and
   a bottom wall, and
   wherein the upper rear handle is positioned at the top of the rear wall and in the plane of the rear wall, and
   wherein the pair of lower rear handles are positioned in the plane of the rear wall.

6. The system of claim 5, wherein openings in the rear wall below each of the pair of lower handles are dimensioned to receive a user's fingers therein when the user holds onto the pair of lower handles.

7. The system of claim 5, wherein openings in the rear wall above each of the pair of lower handles are dimensioned to either:
   receive a user's fingers therein when the user holds onto the upper handle, or
   receive a user's hands therein when the user holds onto the pair of lower handles.

8. The system of claim 5, wherein the child's seat basket includes two leg openings in the rear wall of the shopping cart frame, and wherein the pair of lower rear handles are positioned on opposite sides of the two leg openings of the child's seat basket.

9. The system of claim 2, wherein the pair of lower rear handles are positioned above a bottom of the child's seat basket.

10. The system of claim 2, wherein each of the pair of lower rear handles are connected by wires to the upper rear handle.

11. The system of claim 2, wherein the pair of lower rear handles are connected to side supporting members of the shopping cart frame.

12. The system of claim 2, wherein the lower rear handles extend rearwardly from the rear wall of the shopping cart frame.

13. The system of claim 1, wherein any one of the upper or lower rear handles further comprise plastic gripping surfaces.

14. The system of claim 13, wherein the plastic gripping surfaces have flattened top edges.

* * * * *